United States Patent [19]

Stearns

[11] Patent Number: 5,575,703
[45] Date of Patent: Nov. 19, 1996

[54] SOLAR-POWERED BEEHIVE COOLER AND VENTILATOR

[76] Inventor: Gary D. Stearns, R.R. 2 Box 2355, Vergennes, Vt. 05491

[21] Appl. No.: 404,257

[22] Filed: Mar. 15, 1995

[51] Int. Cl.⁶ .................................................. A01K 47/06
[52] U.S. Cl. .................................................. 449/13
[58] Field of Search ................................ 449/13, 14, 15

[56] References Cited

U.S. PATENT DOCUMENTS

| | | |
|---|---|---|
| 1,435,118 | 11/1922 | Heim et al. . |
| 2,232,343 | 2/1941 | Sauter ........................................ 449/13 |
| 2,434,090 | 1/1948 | Alton ......................................... 236/49 |
| 2,506,118 | 5/1950 | Taylor . |
| 2,574,768 | 11/1951 | Taylor ....................................... 236/49 |
| 2,584,305 | 2/1952 | Taylor . |
| 2,600,194 | 6/1952 | Bennett . |
| 3,927,431 | 12/1975 | Wallace ...................................... 449/14 |
| 3,994,034 | 11/1976 | Van Damme et al. . |
| 4,074,378 | 2/1978 | Shaparew . |
| 4,257,133 | 3/1981 | Steinrucken . |
| 4,300,250 | 11/1981 | Taylor . |
| 4,483,031 | 11/1984 | Shaparew . |
| 4,494,528 | 1/1985 | Horton ...................................... 126/429 |
| 5,379,596 | 1/1995 | Grayson ..................................... 62/362 |

FOREIGN PATENT DOCUMENTS

| | | |
|---|---|---|
| 598458 | 5/1994 | European Pat. Off. . |
| 1625-460A | 2/1991 | U.S.S.R. . |
| 1759351 | 9/1992 | U.S.S.R. ................................... 449/13 |

Primary Examiner—Robert P. Swiatek
Attorney, Agent, or Firm—Theodore R. Touw

[57] ABSTRACT

A solar-powered ventilation module is designed to be inserted between an existing standard beehive and its existing standard cover. The module houses electrical components of the invention and acts as a plenum. A thermostat exposed to the beehive interior air controls a fan when the air temperature inside the beehive exceeds a predetermined limit (preferably about 75°±5° F.). The fan, preferably with a capacity of 30 to 40 cfm, is controlled by the thermostat and powered by a photovoltaic solar panel either directly or by a battery recharged by a solar panel. The fan-induced ventilation helps control temperature, humidity and carbon dioxide level within the hive. A screen prevents bees from passing through the fan. Warm air is exhausted from the hive and vented to the ambient air through a plurality of vents in the side wall of the module, while cooler ambient air is drawn into the beehive through existing hive openings. Exhausted warm air is preferably directed toward the direction of the hive entrance. Pheromones of the particular beehive are carried on the exhausted air toward the front exterior of the hive, where they may be detected by the bees of that beehive. The solar panel is mounted on an adjustable articulated or flexible arm so it can be positioned and aimed for maximum light exposure. The solar panel is preferably connected to other electrical components through extendable connections so that the solar panel may be mounted remotely from the ventilator module if necessary for maximum sunlight. This feature is especially useful if the hive itself is in a shady area. With these extendable connections retracted, the solar panel or its adjustable articulated arm may be mounted directly on the exterior of the module.

19 Claims, 2 Drawing Sheets

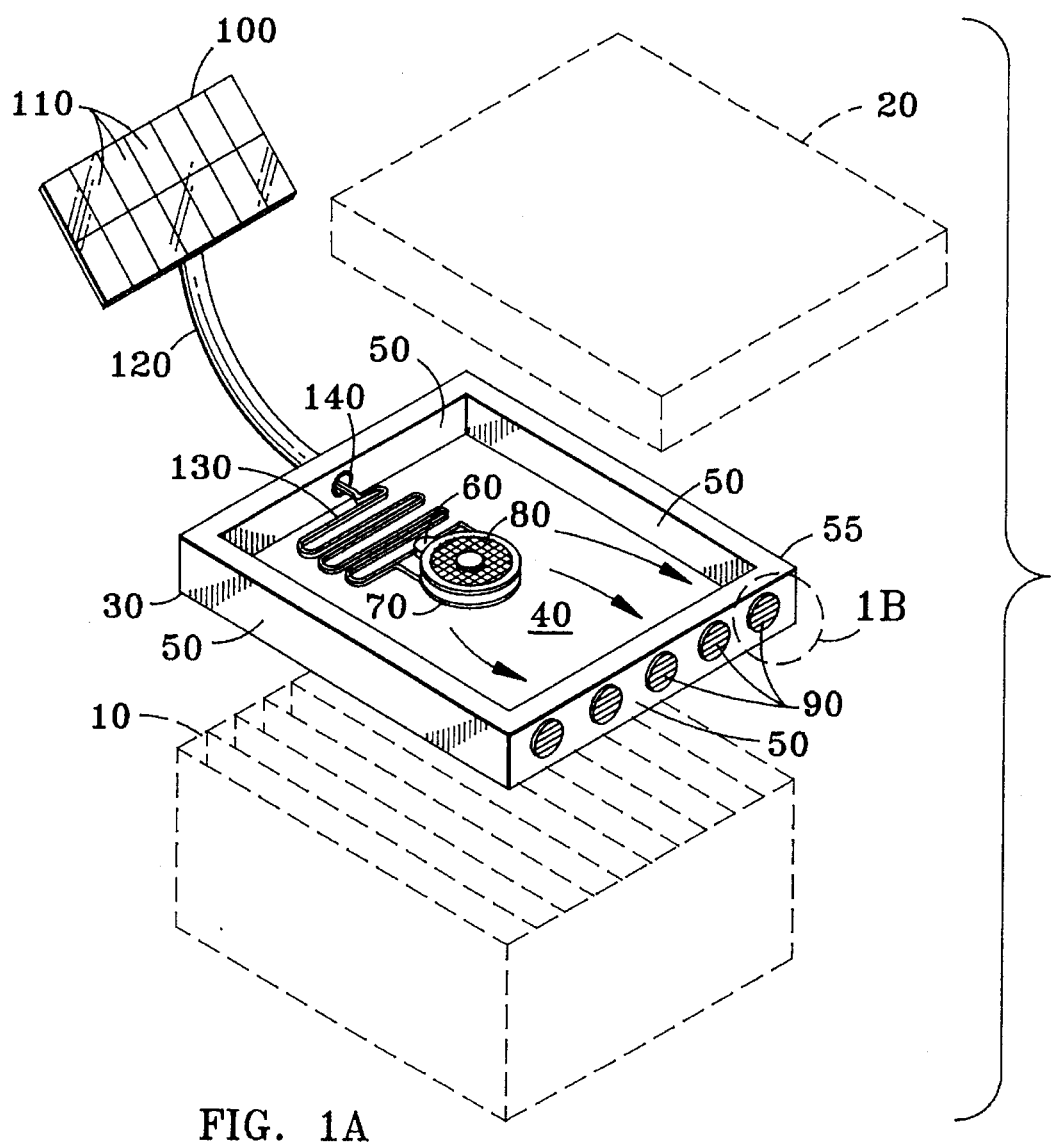
FIG. 1A
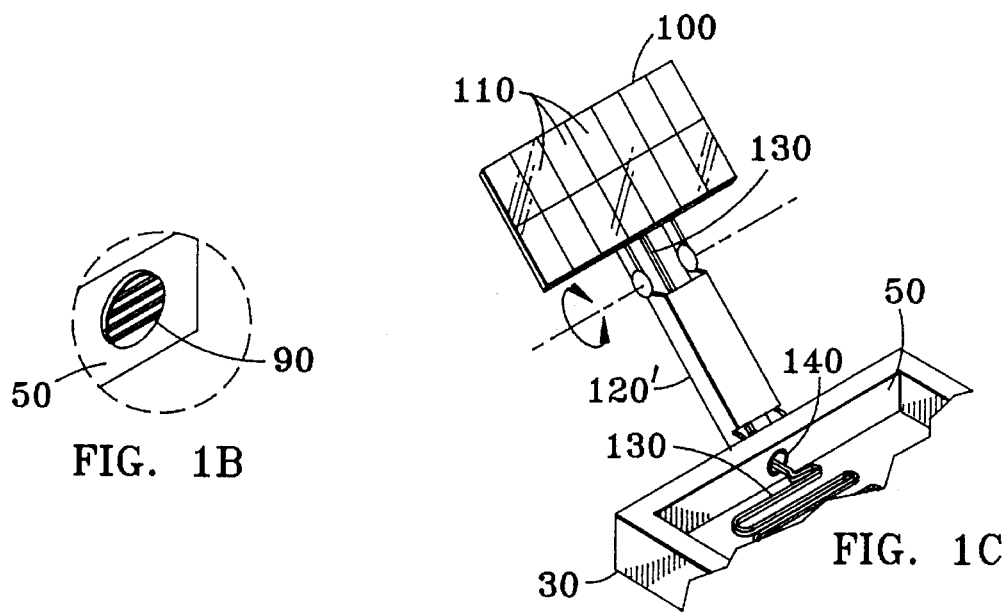
FIG. 1B
FIG. 1C

SOLAR-POWERED BEEHIVE COOLER AND VENTILATOR

FIELD OF THE INVENTION

This invention relates generally to apparatus and methods for beekeeping and particularly to solar-powered accessory apparatus for use with a standard beehive to provide improved temperature control and ventilation of the beehive during hot weather.

BACKGROUND OF THE INVENTION

An article by Bernd Heinrich entitled "Comfort in a Hive: Heads You're Hot, Tails You're Cold," Natural History, Vol. 102, No. 8 (August 1993) p. 53–54 summarizes some temperature effects on honey bees and the bees' activities to control temperature in a beehive that does not have apparatus designed to cool the beehive artificially in hot weather. A limiting factor in honey production is the bees' ability to dry nectar. For three pounds of nectar, the bees must evaporate about two pounds of water to produce about one pound of honey. At 70° F. and 50% relative humidity for example, the bees need about 1,700 cubic feet of air to evaporate each pound of water.

PROBLEMS SOLVED BY THE INVENTION

In hot weather, the temperature inside a beehive can get high enough that honey bees' normal life of up to 6 weeks can be shortened considerably. When hive interior temperatures rise to excessive levels, bees also spend less time in the hive and more time clustering outside the hive entrance. Not only temperatures, but also humidity and carbon dioxide levels in a beehive can rise to excessive levels: e.g. more than 50% relative humidity and more than 3–4% carbon dioxide content. These problems cause reductions in honey production, with consequent economic loss to the beekeeper.

DESCRIPTION OF THE RELATED ART

U.S. Pat. No. 1,435,118 by Heim et al. shows a combined feeder and hive ventilator which includes upper and lower ventilating devices. The upper ventilating device, consisting of a frame with screened openings, is placed on top of the beehive body, with the beehive's normal top resting on the frame. U.S. Pat. No. 2,434,090 by Alton discloses a ventilator for enclosed spaces such as beehives, glass houses, etc. in which a plurality of pivoted flaps can be opened by a single temperature-responsive element. U.S. Pat. No. 2,574,768 by Taylor discloses a temperature-responsive ventilator for beehives, using a bimetallic element to actuate a ventilator slide, housed in a frame that rests on the top edges of the walls of a standard rectangular beehive. U.S. Pat. No. 2,584,305 by Taylor discloses another temperature responsive ventilator for beehives, controlled by the ambient atmospheric temperature outside the beehive. This ventilator replaces the usual inner cover of a standard hive or is used beneath the inner cover. U.S. Pat. No. 3,927,431 by Wallace discloses a ventilating spacer for a movable-frame beehive. The spacer permits the bees to ventilate the hive. Oppositely disposed ventilation openings in the spacer are screened and provided with a protective shield to keep the beehive dry. U.S. Pat. No. 4,074,378 by Shaparew shows a Venturi-tube type of air ventilator for beehives, mounted on a wall of the hive so as to communicate through a tube with an outlet aperture. U.S. Pat. No. 4,257,133 by Steinrucken discloses a solar evaporator beehive cover designed to use solar energy to create sufficient air circulation in the honeycomb area to increase the rate at which nectar is concentrated. The cover is a dark-surfaced pyramid with air vents near the apex. U.S. Pat. No. 4,300,250 by Taylor discloses beehives with passive solar heating. The beehive has a solar collection box provided with a vertical transparent wall through which solar radiation may enter and provided with a thermally conductive sheet located within the box to transmit heat to the beehive. U.S. Pat. No. 4,483,031 by Shaparew discloses a passively ventilating inner cover for beehives wintering outdoors. U.S. Pat. No. 4,494,528 by Horton discloses a beehive solar heating system characterized by a fixed base assembly and a movable collector assembly coupled to the base assembly such that it can move between a closed position and a heating position. Soviet Union patent publication SU 1625-460A (1989) by Eskov discloses an apparatus for controlling a beehive environment at its optimal temperature using a microphone connected via a microphone amplifier to inputs of bandpass filters at corresponding inputs of a comparator. The comparator controls a relay to disconnect a heater when the temperature as indicated by bee sounds gets too high.

OBJECTS AND ADVANTAGES OF THE INVENTION

A major object of the invention is to provide apparatus and methods to cool the interior of beehives during hot weather. Another object of the invention is a modular ventilating apparatus adapted to fit between a beehive body and its top cover. Another object is a ventilating apparatus for cooling a beehive of any one of the commonly-used conventional types having a removable cover, such as the Langstroth type of beehive and those beehives known as the Smith, British National, Modified National, Dadant, Modified Dadant, and Modified Commercial types. Another object is a ventilating and cooling apparatus that is directly responsive to the actual air temperature inside the beehive, rather than one based on the ambient outdoor air conditions or the air at some other location. Yet another object of the invention is a beehive ventilating and cooling method that saves energy costs by utilizing solar energy. A related object is a ventilating apparatus that can continue to operate when solar energy input is temporarily reduced. Another object is an apparatus capable of flexible utilization of solar energy under various conditions of sunlight, solar altitude and azimuth angles, shade, and the orientation of the shadow of the beehive itself. Another object is an apparatus that has quick response to temperature changes, particularly the speed of response provided by electric thermostat control. Another object is a ventilating apparatus with air velocities and a temperature range appropriate for use in a beehive. A particular object is a method and apparatus capable of maintaining the temperature of air internal to the beehive between 60° F. and 112° F., preferably of maintaining the internal air temperature between 70° F. and 80° F., and even more preferably of maintaining an internal air temperature of about 75° F. Other objects of the invention include improved control of humidity and carbon dioxide content of the air inside a beehive. Another object is an apparatus that operates safely while avoiding injury to bees. Another object is a beehive ventilating system that exhausts air containing pheromones from a beehive in a direction near the beehive's entrance. Another object is to increase honey production by allowing bees to remain in the beehive, by reducing the need for bees to exert energy to move air in the beehive, and potentially by extending the useful lifetime of some bees. An important object is a beehive cooling and ventilating apparatus with a low enough cost both of manufacture and of operation to be commercially attractive to beekeepers. These and other objects and advantages will become apparent from a reading of the following summary, detailed specification, and the accompanying drawings.

SUMMARY OF THE INVENTION

The invention is a solar-powered ventilation module designed to be inserted between an existing standard beehive and its existing standard cover. The module houses electrical components of the invention and acts as a plenum. A thermostat exposed to the beehive interior air controls a fan when the air temperature inside the beehive exceeds a predetermined limit (preferably about 75°±5° F.). The fan, preferably with capacity of 30 to 40 cfm, is controlled by the thermostat and powered by a photovoltaic solar panel either directly or by a battery recharged by a solar panel. The fan-induced ventilation helps control temperature, humidity and carbon dioxide level within the hive. A screen prevents bees from passing through the fan. Warm air is exhausted from the hive and vented to the ambient air through a plurality of vents in the side wall of the module, while cooler ambient air is drawn into the beehive through existing hive openings. Exhausted warm air is preferably directed toward the direction of the hive entrance. Pheromones of the particular beehive are carried on the exhausted air toward the front exterior of the hive, where they may be detected by the bees of that hive. The solar panel is mounted on an adjustable articulated or flexible arm so it can be positioned and aimed for maximum light exposure. The solar panel is preferably connected to other electrical components through extendable connections so that the solar panel may be mounted remotely from the ventilator module if necessary for maximum sunlight. This feature is especially useful if the hive itself is in a shady area. With these extendable connections retracted, the solar panel or its adjustable articulated arm may be mounted directly on the exterior of the ventilator module.

BRIEF DESCRIPTION OF THE DRAWINGS

FIG. 1A shows an exploded perspective view of a beehive cooler and ventilator embodiment made in accordance with the invention.

FIG. 1B shows an enlarged view of a detail of FIG. 1.

FIG. 1C shows a partial perspective view of a beehive and ventilator embodiment having an articulated arm.

DETAILED DESCRIPTION OF THE PREFERRED EMBODIMENTS

Figure 2:
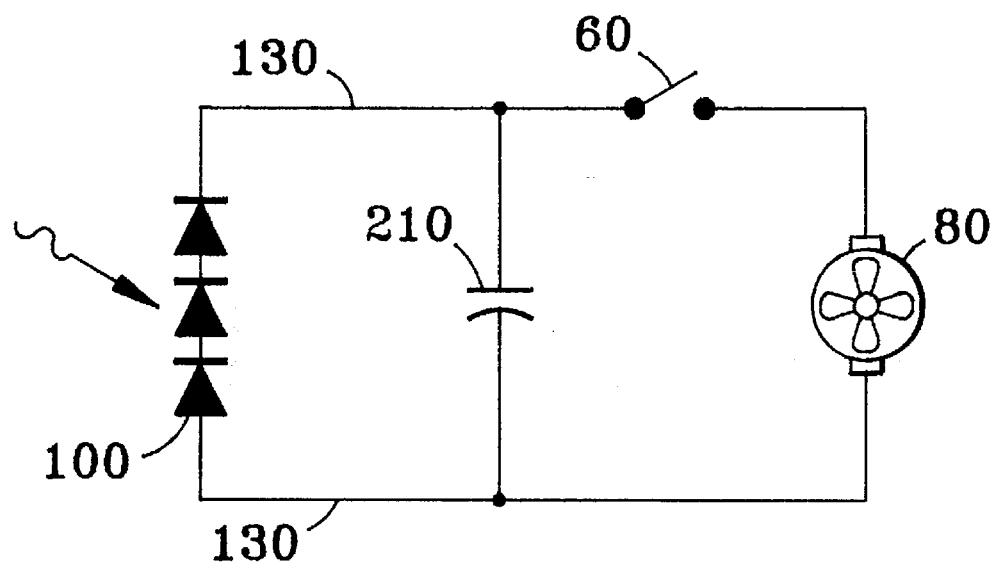
FIG. 2 shows an electrical circuit schematic diagram for use in a beehive cooler and ventilator.

The invention is made in a modular form designed to be installed between a standard beehive body and its standard top cover. It may be made as an integral part of a new beehive, but is more likely to find use as an add-on module for existing beehives. FIG. 1A shows a perspective view of a beehive cooler and ventilator embodiment made in accordance with the invention. A standard existing beehive 10, such as the commonly used Langstroth type of beehive, has an existing top cover 20. The beehive ventilator 30 fits over the top of beehive body 10 in the same manner as an inner cover. Any existing inner cover is preferably removed when ventilator 30 is in use. The existing top cover 20 fits over ventilator 30 and covers the ventilator 30 in the same manner as it would normally cover the beehive body, a top super (not shown), or an inner cover (not shown). If the beehive has a top super, the ventilator 30 is placed onto the top super and beneath top cover 20. Beehive ventilator 30 has a flat panel 40 which is made to cover the entire top opening of body 10, spanning the space between perimeter walls 50 which constitute a frame 55. Panel 40 serves partly to prevent excessive air flow past the brood nest area of the beehive. Panel 40 has a thermostatic switch 60, installed so that its temperature-sensing element is on the bottom side of panel 40, to expose it directly to the interior air of beehive body 10 when ventilator 30 is in place over body 10. Thus thermostatic switch 60 is controlled directly and immediately by the beehive internal air temperature. Panel 40 has an aperture 70 for an electric fan 80 positioned in or over aperture 70 and oriented to exhaust hot air upward from the beehive body 10. Electric fan 80 has a DC motor. When ventilator 30 is installed and covered by existing cover 20, the interior volume of ventilator 30 functions as a plenum for exhausted air. Located in at least one of the perimeter walls 50 are exhaust vents 90, shown in FIGS. 1A and 1B. Exhaust vents 90 are preferably each made by installing a standard covered attic vent assembly in a suitable size hole drilled in a perimeter wall 50. Exhaust vents 90 preferably include louvers. The preferred perimeter wall 50 for vents 90 is the wall facing the beehive entrance, so that air containing pheromones from the particular beehive is exhausted in that direction, where bees may use the scent for orientation.

In the simplest embodiment, electric power for fan 80 is provided directly by a photovoltaic solar panel 100 wired in series with fan 80 and thermostatic switch 60, and the power is controlled by thermostatic switch 60. Solar panel 100 may conventionally consist of a number of individual photodiode structures 110 combined in a conventional manner to supply appropriate voltage and current needed to drive the motor of electric fan 80 at a desired speed. A suitable commercially available solar panel is the amorphous silicon photovoltaic plate Model CG 1206 (15 Volts, 133 milliamperes) available from Neste Advanced Power Systems of Vantaa, Finland. Another suitable type is the Panasonic "Sun Ceram" solar panel available from the Panasonic Corp. Fan 80 preferably produces a flow rate of less than 50 cubic feet per minute, and even more preferably between 30 and 40 cubic feet per minute. Fan 80 should be a quiet fan such as the Sunon 12 volt fan Part No. KDE 1209 PTS 3-6 available from Diamond Electronics of New Hampshire.

Solar panel 100 may be supported by a flexible and adjustable tube 120 which also serves to protect conductive electric wires 130 passing through it. Flexible and adjustable tube 120 may be a semi-rigid spiral wound tube such as those conventionally used for "gooseneck" lamps and audio microphone mounts. It may be mounted to ventilator module 30 by means of a flange (not shown). The flexible and adjustable mount should provide solar panel 100 with at least five degrees of freedom, viz. three degrees of translational freedom and two orientation angles (for sun altitude and azimuth angles). Wires 130 also pass through an aperture 140 which communicates with the interior of flexible and adjustable tube 120. An articulated arm 120' (as shown in FIG. 1C) may be used instead of a flexible and adjustable tube 120. In that case, wires 130 are guided along the articulated arm and may be fastened loosely at intervals along the arm. Such arrangements of electric wires with articulated arms are commonly used in conventional work lamps, for example. The articulated arm 120' should have at least one joint and preferably multiple joints, such as ball and socket joints for example. The articulated arm 120' should provide the same five degrees of freedom to solar panel 100 as described above for flexible and adjustable tube 120.

Wires 130 constitute an extendable connection between solar panel 100 and the other electrical components of the invention. Although wires 130 are shown in FIGS. 1A and 1C in their retracted arrangement, wires 130 are made long enough to reach solar panel 100 even when it is removed from the ventilator module and mounted remotely. The free length of wires 130 available for extension between solar panel 100 and thermostatic switch 60 is preferably at least ten feet. Solar panel 100 preferably has means for remotely mounting it on objects external to the beehive. For example mounting tabs (not shown) with holes for screws or wire may serve this purpose.

FIG. 2 shows an electrical circuit schematic diagram for use in a beehive ventilator. Solar panel 100 is connected in series with thermostatic switch 60 and the DC motor of fan 80 through wires 130 so that operation of fan 80 is controlled directly by the internal air temperature within the beehive through the operation of thermostatic switch 60.

A capacitor 210 is preferably used to stabilize the DC voltage that is applied to electric fan 80 when thermostatic switch 60 is closed. Capacitor 210 preferably has a capacitance of 1,000 to 5,000 microfarads. In alternative embodiments, a voltage regulator, a voltage-dependent resistance (VDR) having suitable non-linear resistance behavior in the output-voltage range of solar-panel 100, or other conventional voltage-stabilizing means may be used in place of capacitor 210 to stabilize voltage. However capacitor 210 or other voltage-stabilizing means may be omitted for lower apparatus cost.

Figure 3:
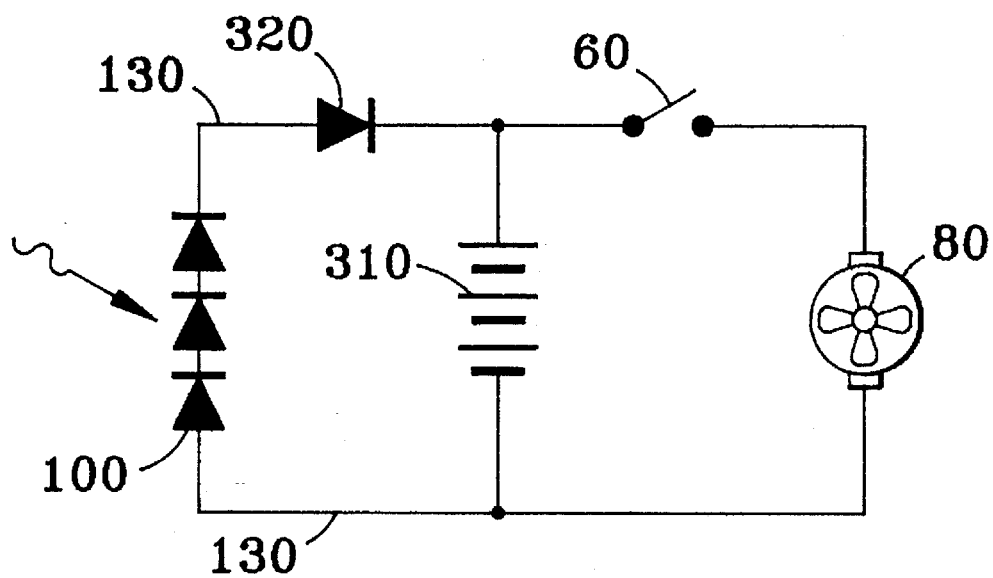
FIG. 3 shows another electrical circuit schematic diagram of a beehive cooler and ventilator including a battery.

FIG. 3 shows another electrical circuit schematic diagram of a beehive ventilator including a battery 310. Battery 310 is continuously charged by solar panel 100 through wires 130 and diode 320 when there is sufficient light on solar panel 100. Diode 320 prevents battery 310 from discharging through solar panel 100 when the solar panel is in darkness. If necessary, a variable series resistance (not shown) could be used in series to control the speed of the DC motor of fan 80. More elaborate circuits could be used, such as integrated circuits designed for control of battery charging.

The invention will be further clarified by considering the following example, which is intended to be purely exemplary of the use of the invention. A ventilator module made in accordance with this invention was tested in the inventor's beehive at New Haven, Vt., with favorable results. The test model, made like the embodiment of FIG. 1A, was inserted between the beehive top cover and the top super after removing the existing standard inner cover. There was less clustering observed on the outside of the beehive and there was increased honey production in the beehive with which the invention was tested.

Other embodiments of the invention, with various alterations and modifications which may differ in particular details from those that have been described in the preceding specification and description, will be apparent to those skilled in the art from a consideration of this specification or from practice of the invention disclosed herein. For example, more elaborate electrical systems may be made using proportional control of fan speed or integrated circuit control of battery charging. The ventilator could be operated on power from AC mains or from a rechargeable battery charged from AC mains if or when solar energy is not reliably available. It is intended that the specification and examples be considered as exemplary only, with the true scope and spirit of the invention being defined by the following claims.

Having described my invention, I claim:

1. An apparatus for ventilating and cooling a beehive of the type having a beehive body and a removable cover, comprising:

a) a frame adapted to fit between said beehive body and said removable cover, said frame having perimeter walls surrounding an area and having at least one air vent through said perimeter walls, b) a panel supported by said frame and spanning said area, said panel having top and bottom major surfaces and an opening communicating between said top and bottom major surfaces, c) a thermostatic switch mounted on said bottom major surface of said panel so as to be exposed to the interior air of said beehive body when said panel covers said beehive body, d) a screen covering said opening to prevent passage of bees therethrough, e) an electric fan positioned to exhaust hot air from said beehive body through said opening and outward through said at least one vent, f) a source of electric power energized by solar radiation, and g) conductive means connecting said thermostatic switch, said source of electric power, and said electric fan, to power said electric fan when the air temperature within said beehive body exceeds a predetermined value.

2. An apparatus as recited in claim 1, wherein said source of electric power energized by solar radiation comprises a photovoltaic panel.

3. An apparatus as recited in claim 2, wherein said photovoltaic panel further comprises one or more photodiodes.

4. An apparatus as recited in claim 1, wherein said source of electric power energized by solar radiation is mounted on said perimeter walls of said frame.

5. An apparatus as recited in claim 1, wherein said source of electric power energized by solar radiation further comprises a battery, a battery-charging circuit, and a solar panel connected to maintain said battery in a state of charge.

6. An apparatus as recited in claim 1, further comprising an articulated arm mechanically attached to said frame and to said source of electric power energized by solar radiation, and wherein said conductive means comprises wires passing along and contiguous to said articulated arm.

7. An apparatus as recited in claim 1, further comprising a flexible and adjustable tube attached to said frame and to said source of electric power energized by solar radiation, and wherein said conductive means comprises wires passing through said flexible and adjustable tube.

8. An apparatus as recited in claim 7, wherein said flexible and adjustable tube is made long enough to reach around said beehive in order to avoid the shadow of said beehive.

9. An apparatus as recited in claim 1, wherein said conductive means comprises wires having a length, and wherein said source of electric power energized by solar radiation is mounted remotely from said frame at a distance determined by said length of said wires.

10. An apparatus as recited in claim 1, wherein said at least one air vent comprises a standard covered attic vent assembly.

11. An apparatus as recited in claim 1, wherein said electric fan when energized has a flow rate of less than 50 cubic feet per minute.

12. An apparatus as recited in claim 1, wherein said electric fan when energized has a flow rate between 30 and 40 cubic feet per minute.

13. An apparatus as recited in claim 1, wherein said predetermined temperature is between 60° F. and 112° F.

14. An apparatus as recited in claim 1, wherein said predetermined temperature is between 70 and 80 degrees Fahrenheit.

15. An apparatus as recited in claim 1, wherein said predetermined temperature is about 75 degrees Fahrenheit.

16. An apparatus as recited in claim 1, wherein said beehive is a standard beehive of the Langstroth type and said frame is adapted to fit a standard-size Langstroth-type beehive.

17. An apparatus as recited in claim 1, wherein said beehive is a standard beehive of the British Modified National type and said frame is adapted to fit a standard-size British-Modified-National-type beehive.

18. An apparatus for ventilating and cooling a beehive of the type having a beehive body with an entrance in one side and a removable cover, comprising:

a) a frame adapted to fit between said beehive body and said removable cover, said frame having perimeter walls surrounding an area and a plurality of louvered air vents through one of said perimeter walls proximate said one side having said entrance, b) a panel supported by said frame and spanning said area, said panel having top and bottom major surfaces and an opening communicating between said top and bottom major surfaces, c) a thermostatic switch mounted on said bottom major surface of said panel so as to be exposed to the interior air of said beehive body when said panel covers said beehive body, d) a screen covering said opening to prevent passage of bees therethrough, e) an electric fan positioned to exhaust hot air from said beehive body through said opening and outward through said plurality of louvered air vents, f) a photovoltaic panel source of electric power energized by solar radiation, g) an articulated and adjustable arm having first and second ends being attached at said first end to one of said perimeter walls and being attached at said second end to said photovoltaic panel source of electric power, and h) conductive wire means extending along said articulated and adjustable arm and electrically connecting said thermostatic switch, said source of electric power, and said electric fan in series connection, to power said electric fan when the air temperature within said beehive body exceeds a predetermined value.

19. An apparatus as recited in claim 18, wherein at least one of said first and second ends of said articulated and adjustable arm is attached releasably, and said conductive wire means has a sufficient length to allow said photovoltaic panel source of electric power to be located remotely from said frame.

* * * * *